Dec. 23, 1958 — O. J. NYGREN — 2,865,161
CRAB GRASS RAKE ATTACHMENT FOR REEL TYPE MOWERS
Filed Jan. 11, 1957
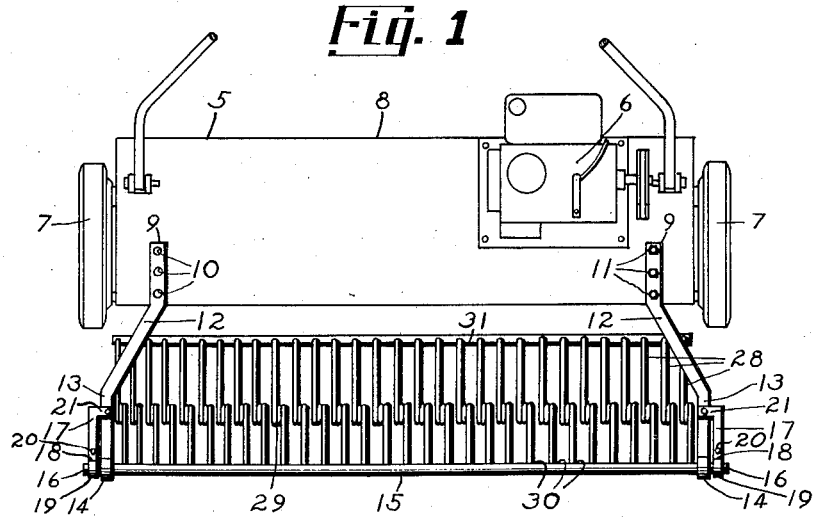
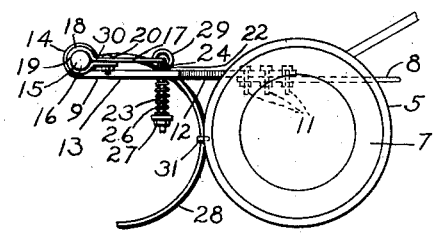
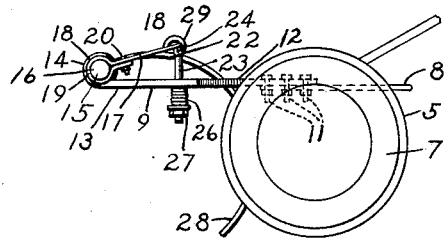
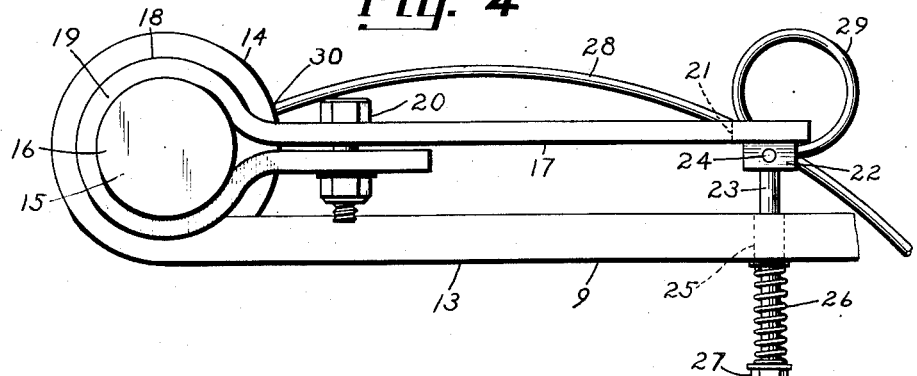
INVENTOR.
Otto J. Nygren
BY
*David K. Kilgore*
ATTORNEY

United States Patent Office 2,865,161
Patented Dec. 23, 1958

2,865,161

CRAB GRASS RAKE ATTACHMENT FOR REEL TYPE MOWERS

Otto J. Nygren, Minneapolis, Minn.

Application January 11, 1957, Serial No. 633,614

1 Claim. (Cl. 56—249)

My present invention relates broadly to rake attachments for lawn mowers and, more specifically, to a crab grass rake attachment for reel type mowers. While the invention is intended particularly for mowers having a power driven reel, it will be understood that the same is entirely capable of adaptation to manually operated mowers of the reel type.

The principal object of this invention is to provide a crab grass rake for operation ahead of the cutter blades of a reel type lawn mower, whereby forward movement of the mower automatically engages the rake with its work and lifts the grass into a position whereby it may be engaged and cut by the blades of the revolving reel.

Another object of this invention is to provide a crab grass rake attachment for reel type lawn mowers that is entirely self-contained and is readily attachable or detachable to the frame or body structure of a mower with a minimum amount of tools.

Another object of this invention is to provide a crab grass rake attachment for reel type lawn mowers wherein the tines of the rake are spring loaded to protect the mower and cutter blades when an obstruction is encountered thereby and also to adjustably tension the tines to raise stubborn flat-lying grasses to the blades and still not damage the lawn by exerting a digging or tearing action thereon.

Another object of this invention is to provide a crab grass rake attachment that is entirely automatic in operation, the action thereof being imparted by the forward movement of the mower and the engagement of the tines with the ground.

These and other objects of the invention will be apparent from the following specification and claims, taken in conjunction with the appended drawing which forms a part of this application and in which like characters indicate like parts throughout the several views.

It is well known that the greatest difficulty to be encountered in the control of crab grass and other flat-lying creeping grasses is the inability of conventional mowers to reach said grasses for cutting. It has been found that periodic cutting of the exposed portions of these grasses is the most effective means of control and hence this invention which is designed to reach under these flat-lying creeping grasses and raise said exposed portions to be engaged by the rotating blades of the mower. Due to the natural tendency of these creeping weeds and grasses, it is virtually impossible to rake them by conventional methods over a given area and then follow with a mower for the reason that almost immediately such weeds and grasses will return to their normal levels and, furthermore, the cutter bar of a reel type mower has a tendency to flatten said growth to be cut, before it can be engaged by the cooperating cutter blades of the mower. My invention operates just far enough ahead of the cutting members of the mower so as to feed the ends or stalks of weeds or grass into the blades to be cut.

Referring to the drawings:

Fig. 1 is a top plan view showing the invention attached to a fragmentary diagrammatic illustration of a conventional reel type power mower;

Fig. 2 is a side elevational view diagrammatically showing a fragmentary section of a mower with the invention shown in detail in neutral position when the mower is stationary;

Fig. 3 is a view similar to Fig. 2 with the exception that the positions of the relative parts are shown as when the mower is in forward motion; and Fig. 4 is an enlarged side elevational view of the invention, a portion of one of the tines being broken away, showing details of an adjustable tension assembly.

The numeral 5 indicates a diagrammatically illustrated top plan view of a conventional reel type power mower having a motor 6, a pair of ground wheels 7, and a reel guard 8 which affords a mount for the rake which is the subject matter of this invention.

A pair of relatively heavy transversely flat mounting bars 9 are provided at their inner end portions with a plurality of longitudinally spaced holes 10 which are in register with a plurality of holes in the reel guard 8 and whereby the rake attachment is detachably connected to the mower by means of mounting bolts 11 that extend through the said aligned holes 10 to rigidly connect the rake attachment to the mower. It will be understood that a plurality of holes is provided for such mounting purpose to universally adapt the rake to mowers of the class described, all of which may have slightly different reel guards or the like on which the rake is mounted as it is highly important that the rake operate at the proper distance ahead of the cutter blades of the mower.

The mounting bars 9 extend forwardly of their mounting stations on the reel guard 8 in substantially a horizontal plane and diverge outwardly from their respective mounting stations thence forwardly parallel to their inner end portions, as shown by the numerals 12 and 13, respectively, and terminate at their outer end portions in solid collar bearings 14, in which bearings a tine carrier bar 15 is mounted for axial rotation. It will be understood that the outward diverging relation of the mounting bars is provided to further facilitate the universal mounting of the rake attachment and accommodate the same to mowers of varying widths while at the same time permit the mounting of a tine carrier bar 15 of sufficient width to endwise overlap the width of the cutting reel of a mower, not shown.

The outer end portions 16 of the tine carrier bar 15 extend somewhat outwardly of the collar bearings 14 and thus afford a mount for a pair of adjustably mounted spring loaded tensioning bars 17. These tensioning bars are in the form of a horizontally disposed L, the outer end portions 18 of which encircle the outer end portion 16 of the tine carrier bar 15 to form a clamping sleeve 19 to thus afford axial adjustment of the tensioning bars 17 on the tine carrier bar 15. A pair of aligned holes in the upper portion and the underlying end portion of the tensioning bar 17, rearwardly of the clamping sleeve 19, have a screw-threaded bolt 20 extending therethrough to frictionally clamp the tensioning bar 17 in proper adjustment with the said tine carrier bar 15.

The inner end portion 21 of the tensioning bars 17 is bent inwardly substantially at right angles to the tension bar to a point at which it overlies a mounting bar 9. A pair of depending ears or lugs 22 are formed on the outer end portion of the portions 21 of the tensioning bar 17 and afford a pivotal mount for a pair of rockable rods 23.

These rods 23 are pivotally mounted at their upper end portions between the lugs 22 by means of pivot pins 24 that extend through aligned holes in the lugs 22 and a transverse bore, not shown, in the heads of the rods 23. The rods 23 extend downwardly in a relatively perpendicular plane through elongated slots 25 in the respective mounting bars 9. A pair of coiled tensioning springs 26 encircle the lower end portion of the rods 23, engage the lower surface of the mounting bars 9 as a base of resistance when said springs 26 are compressed between said mounting bars 9 and a flanged nut 27 having screw-threaded engagement with the lower end portion of the rod 23.

It will thus be seen that with the springs 26 under slight compression, and the clamping sleeve 19 tightly engaging the tine carrier bar 15, further compression of the springs 26 will impart greater tension to the tines 28 mounted on the tine carrier bar 15.

The tines 28 are of spring steel construction and substantially semicircular in side elevation, and are rigidly mounted in longitudinally spaced arrangement on the tine carrier bar 15 approximately one inch apart. To impart additional spring action to the tines 28, two convolutions 29 are formed in said tines outwardly of their anchor points 30 in the tine carrier bar 15. A spacer bar 31 through which the tines 28 extend, to maintain the longitudinal spacing thereof, is rigidly attached to each tine 28 at the approximate center thereof.

In operating position, the rake attachment is rigidly secured to the mower with the tines 28 pointing forwardly in the direction of movement and resting upon the ground at a slight angle thereto, as shown in Fig. 2. As the mower moves forward, the tine points engage the ground and the tine carrier bar 15 turns axially in the collar bearings 14, thus permitting the points of the entire tine assembly to assume a position having a still greater angle relative to the ground. The weight of the mower holds the tines to their work and the inherent spring tension of the tines themselves and the action of the tensioning bar permits the tines to ride over the ground with such action as to work the tine points under creeping low and flat-lying weeds and grasses and into contact with the cutting members of the mower. The spring-like action of the tine and the tensioning bar cooperate to provide just the right amount of pressure of the tines with the ground so as to raise the growth to be cut and still not exert such contact pressure as to make movement of the mower difficult or tear up inoffensive grasses.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claim as are stated herein or required by the prior art.

What I claim is:

For use in a rake attachment for lawn mowers comprising a pair of supporting arms for rigidly but detachably mounting the attachment in longitudinally spaced and parallel relation to a forward transverse edge portion of the frame of a lawn mower above and forwardly of the cutter blades of said mower, horizontally disposed bearing members formed in the outer end portion of each of said supporting arms, a rake head comprising a plurality of longitudinally spaced downwardly and outwardly projected bowed tines rigidly mounted in a tine carrier bar and a spacer bar rigidly attached to each tine substantially at the longitudinal center thereof affording means for maintaining spaced arrangement of said tines and substantial rigidity to said rake head, said tine carrier bar being journaled at its outer end portions in the bearings of each supporting arm with a working fit for axial rocking rotation, the outer end portions of the tine carrier bar extending outwardly of each of said bearings in the said supporting arms to afford a mounting station thereon; tension assemblies on the outer end portions of the carrier bar comprising a pair of spring tensioned clamping members the forward end portion of which being rotatably and adjustably attached to the said outwardly projecting end portions of the tine carrier bar and continuing in relatively long rearwardly extending arms having a depending rod rockably attached to its rear end portion, said rod extending through an aligned transverse bore in the rear end portion of its cooperating supporting arm intermediately thereof, a coiled spring encircling said rod in engagement with and below the respective supporting arm, a nut threadedly engaging the lower end portion of said rod for adjustably tensioning the coiled spring between said arm and said nut whereby the position of the tines, mounted on the tine carrier bar, may be held yieldingly locked in predetermined position relative to the ground being worked.

References Cited in the file of this patent

UNITED STATES PATENTS

| | | |
|---|---|---|
| 2,143,402 | Baker | Jan. 10, 1939 |
| 2,157,620 | McGrath et al. | May 9, 1939 |
| 2,593,780 | McIntosh | Apr. 22, 1952 |
| 2,751,741 | Carson | June 26, 1956 |